(12) United States Patent
Yu et al.

(10) Patent No.: US 11,532,878 B2
(45) Date of Patent: Dec. 20, 2022

(54) ELECTRONIC DEVICE AND WEARABLE DEVICE

(71) Applicant: Advanced Semiconductor Engineering, Inc., Kaohsiung (TW)

(72) Inventors: Yuanhao Yu, Kaohsiung (TW); Wei Fan Wu, Kaohsiung (TW); Feng Chuan Tsai, Kaohsiung (TW); Mingjhih Tsai, Kaohsiung (TW); Shih Yuan Ho, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 17/239,481

(22) Filed: Apr. 23, 2021

(65) Prior Publication Data

US 2022/0344802 A1 Oct. 27, 2022

(51) Int. Cl.
*H01Q 1/48* (2006.01)
*G09G 3/00* (2006.01)
*G06F 3/041* (2006.01)
*G02F 1/167* (2019.01)
*G02F 1/16753* (2019.01)
*H01Q 1/24* (2006.01)

(52) U.S. Cl.
CPC ............... *H01Q 1/48* (2013.01); *G02F 1/167* (2013.01); *G02F 1/16753* (2019.01); *G06F 3/041* (2013.01); *G09G 3/035* (2020.08); *H01Q 1/24* (2013.01); *G09G 2310/068* (2013.01)

(58) Field of Classification Search
CPC ......... G02F 1/136222; G02F 1/133357; G02F 1/13306; G02F 1/13394; G02F 1/13454; G02F 1/136209; G02F 1/1362; G09G 3/36; G09G 2300/0408; G09G 2310/061; G09G 2310/08; G09G 3/041–048
See application file for complete search history.

(56) References Cited

U.S. PATENT DOCUMENTS

| | | | |
|---|---|---|---|
| 2005/0237317 A1* | 10/2005 | Cok | G09G 3/3208 345/173 |
| 2017/0083126 A1* | 3/2017 | Lim | G06F 3/0416 |
| 2017/0083153 A1* | 3/2017 | Yeh | G06F 3/0412 |
| 2019/0056836 A1* | 2/2019 | Lee | G06F 3/04184 |
| 2021/0193012 A1* | 6/2021 | Jung | H04M 1/0266 |

FOREIGN PATENT DOCUMENTS

CN 204069257 U 12/2014

* cited by examiner

*Primary Examiner* — Roy P Rabindranath
(74) *Attorney, Agent, or Firm* — Foley & Lardner LLP

(57) ABSTRACT

The present disclosure provides an electronic device. The electronic device includes a display module having a grounding element disposed under the display module and an antenna pattern. The grounding element is configured to function as a reference ground of the antenna pattern. A wearable device is also provided.

12 Claims, 8 Drawing Sheets

ELECTRONIC DEVICE AND WEARABLE DEVICE

BACKGROUND

1. Technical Field

The present disclosure relates to an electronic device having a display module and an antenna pattern and a wearable device.

2. Description of the Related Art

A wearable device generally has a housing which accommodates some electronic components. Extra function(s) may be required to be integrated into the wearable device (wireless communication, touch controls, etc.), which means more components (antennas, touch sensors, etc.) should be introduced into the housing and more power may be required.

As a result, size and weight of the wearable device may inevitably increase, which may adversely affect a user's experience. In addition, electromagnetic waves transmitted or received by the antennas may be affected or blocked by the other components, which may degrade the performance of the antennas.

SUMMARY

In some embodiments, an electronic device includes a display module having a grounding element disposed under the display module and an antenna pattern. The grounding element is configured to function as a reference ground of the antenna pattern.

In some embodiments, a wearable device includes a supporting element. The a supporting element includes a sensing area configured to sense a signal and a display area laterally spaced apart from the sensing area and electrically connected with the sensing area. The display area is configured to display a content in response to the signal.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
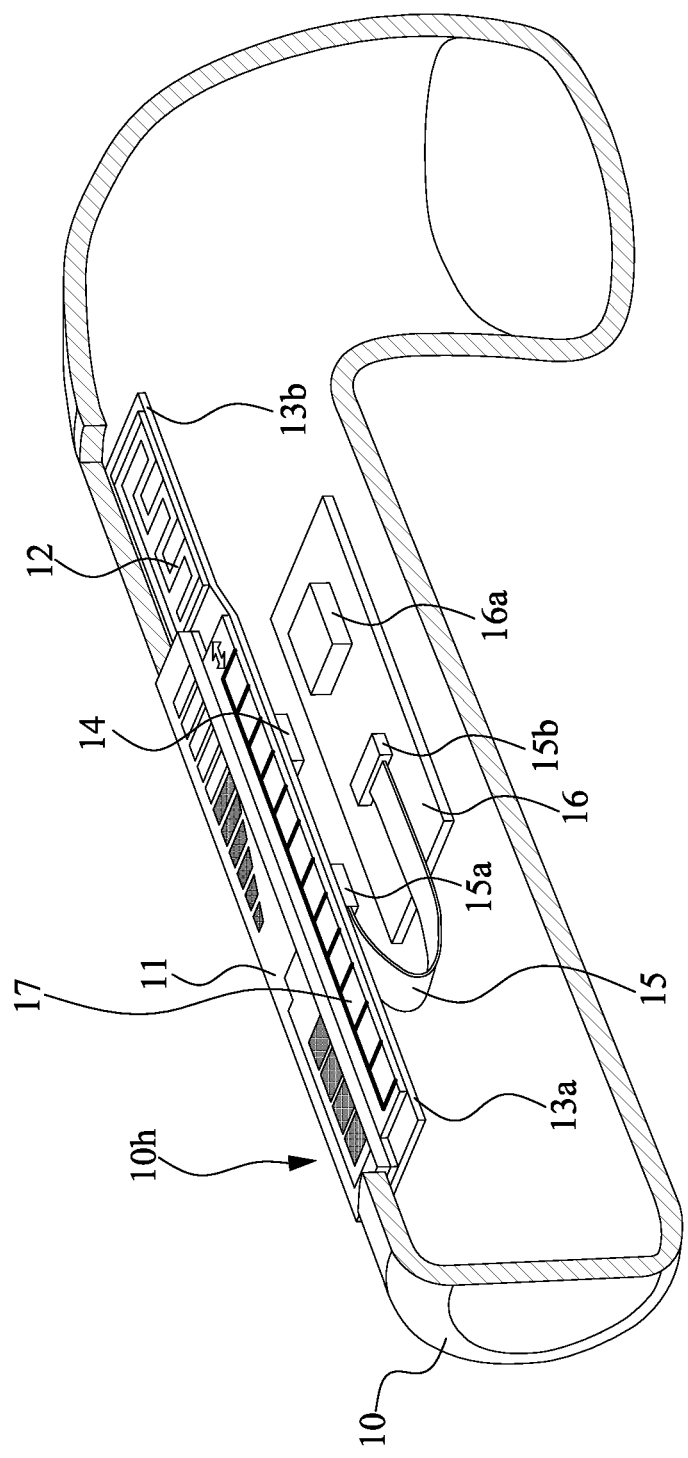
FIG. 1A illustrates a perspective view of an electronic device in accordance with some embodiments of the present disclosure.

The following disclosure provides for many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

The following description involves an antenna module and a semiconductor device package having the antenna module.

FIG. 1A illustrates a perspective view of an electronic device 1 in accordance with some embodiments of the present disclosure. Examples of the electronic device 1 may include headphones, earphones, or an earpiece. While the electronic device 1 is shown as an earpiece in the figures, the electronic device 1 may be an electronic watch, electronic glasses, an electronic wristband, other electronic devices, or other wearable devices.

As shown in FIG. 1A, the electronic device 1 may have a case or housing 10, a display module 11, an antenna pattern 12, a supporting element or a supporting layer 13 (including portions 13a and 13b), a controller 14, a connector 15, a substrate 16, and a sensing element 17. The antenna pattern 12, the supporting layer 13, the controller 14, the connector 15, and the substrate 16 may be enclosed or encapsulated in the housing 10. A portion (e.g., a screen) of the display module 11 may not be covered by the housing 10. For example, a screen of the display module 11 may be exposed from an opening 10h of the housing 10. Contents such as text, graphics, and video may appear on the screen for a user's viewing. In some embodiments, the contents may include the time, distance, heart rate, temperature, a pedometer, etc. A portion of the sensing element 17 may not be covered by the housing 10. For example, a portion of the sensing element 17 may be exposed from an opening 10h of the housing 10. In some embodiments, a touch control function may be achieved through the sensing element 17. For example, the sensing element 17 may be or include a touch panel. For example, the sensing element 17 may be or include a scrollbar. For example, the sensing element 17 may be or include a sensing electrode.

Figure 1B:
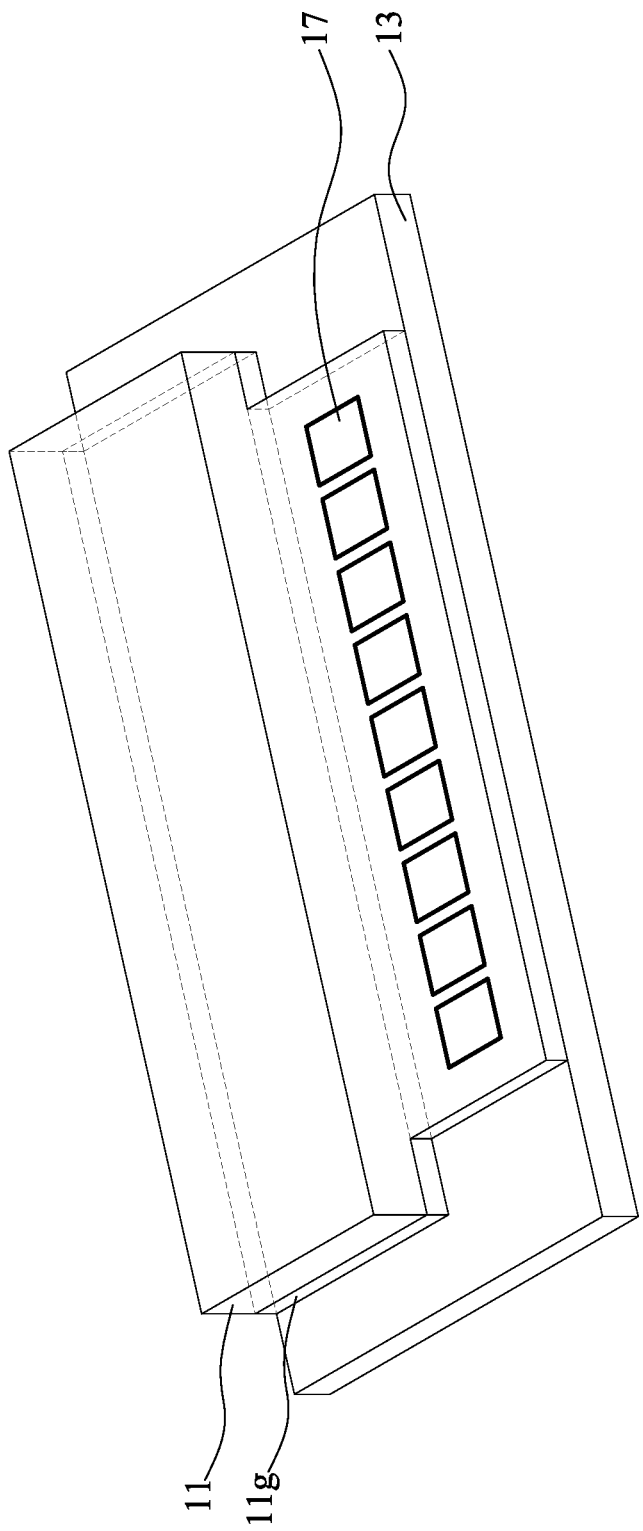
FIG. 1B illustrates a perspective view of a part of an electronic device in accordance with some embodiments of the present disclosure.

FIG. 1B illustrates a perspective view of a part of an electronic device in accordance with some embodiments of the present disclosure. In some embodiments, the electronic device 1 in FIG. 1A may have a perspective view as illustrated in FIG. 1B. It should be noted that only the supporting layer 13, the display module 11, the sensing element 17, and a grounding element 11g are illustrated in FIG. 1B, and some components of the electronic device in FIG. 1A are omitted for conciseness.

Referring to FIG. 1B, the display module 11 and the sensing element 17 may be disposed over or on the supporting layer 13. The display module 11 and the sensing element 17 may be disposed side-by-side. The display module 11 and the sensing element 17 may be laterally spaced apart from each other. The display module 11 and the sensing element 17 may be laterally physically disconnected. The supporting layer 13 may have a display area where the display module 11 is disposed and a sensing area where the sensing element 17 is disposed. The display module 11 may be disposed over or on the display area of the supporting layer 13. The sensing element 17 may be disposed over or on the sensing area of the supporting layer 13. The display area and the sensing area may be defined on the same surface of the supporting layer 13. The display area and the sensing area may be spaced apart from each other. The display area and the sensing area may be not overlapped. In some embodiments, the sensing element 17 may be or include a sensing electrode disposed or formed on a substrate. For example, as shown in FIG. 1B, the sensing element 17 may include a plurality of sensing electrodes disposed or formed on a substrate, and the substrate is disposed on the supporting layer 13 (such as disposed on the sensing area of the supporting layer 13). In some embodiments, the sensing element 17 may be or include a sensing electrode on the sensing area of the supporting layer 13. For example, the sensing element 17 may be directly formed in the supporting layer 13. For example, the sensing element 17 may be integrated in the supporting layer 13. For example, the sensing element 17 may be exposed from the supporting layer 13.

The grounding element 11g may be disposed over or on the display area of the supporting layer 13. The grounding element 11g may be disposed under the display module 11. The grounding element 11g may be disposed between the display module 11 and the supporting layer 13. The grounding element 11g may be laterally spaced apart from the sensing element 17. The grounding element 11g may be laterally physically disconnected from the sensing element 17.

Figure 2A:
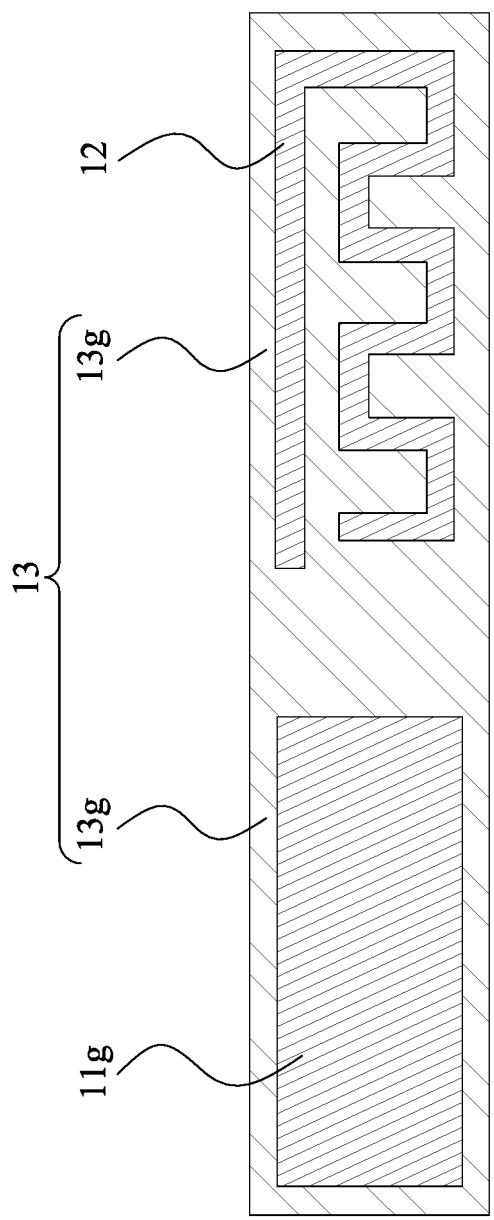
FIG. 2A illustrates a top view of an electronic device in accordance with some embodiments of the present disclosure.
Figure 2B:
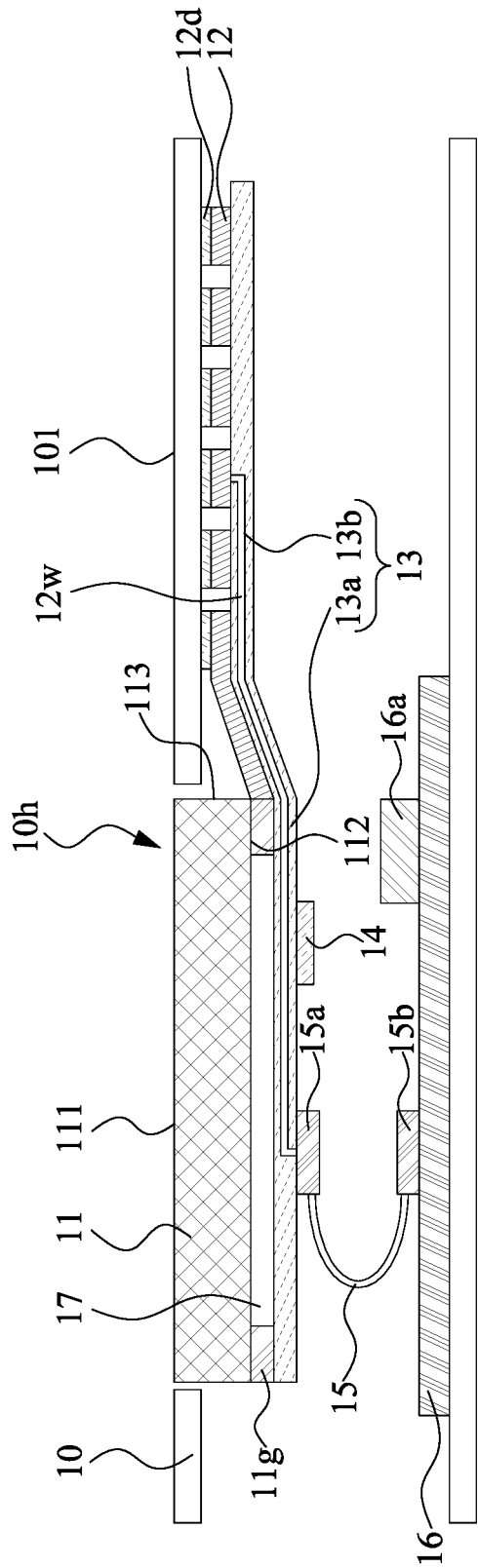
FIG. 2B illustrates a side view of an electronic device in accordance with some embodiments of the present disclosure.

FIG. 2A and FIG. 2B illustrate a top view and a side view, respectively, of an electronic device in accordance with some embodiments of the present disclosure. In some embodiments, the electronic device 1 in FIG. 1A may have a top view and a side view as illustrated in FIG. 2A and FIG. 2B. It should be noted that only the supporting layer 13, the antenna pattern 12, and a grounding element 11g are illustrated in FIG. 2A, and some components of the electronic device in FIG. 2A are omitted for conciseness.

Referring to FIG. 2B, the display module 11 may have a surface 111, a surface 112 opposite to the surface 111, and a surface 113 (which can also be referred to as a lateral surface) extending between the surface 111 and the surface 112. A screen of the display module 11 may be adjacent to (or may be formed on) the surface 111 and exposed from the opening 10h of the housing 10.

In some embodiments, the display module 11 may include a screen, a display comprised of a series of pixels, a graphical user interface and the like. In some embodiments, the display module 11 may include a liquid-crystal display (LCD), a light-emitting diode (LED) display, an organic light-emitting diode (OLED) display (such as an OLED glass display, an OLED plastic display, the like), or a combination thereof. In some embodiments, the display module 11 may include an electronic paper display (which can also be referred to as an e-paper). The e-paper may include a plurality of layers such as a charge receiving layer, a conductive ground layer, and a microcapsule layer sandwiched between the charge receiving layer and the conductive ground layer. The microcapsule layer may contain microcapsules aligned as a single layer. Each microcapsule may include charged pigment particles (such as white particles and black particles) suspended in a fluid medium. The charged pigment particles can be attracted or repelled by a charge on the charge receiving layer to create a desired image. In other words, the charged pigment particles may be manipulated in the presence of an electric field such that they are either repelled from or attracted to the charge receiving layer depending on a charge associated with each type of particle. In some embodiments, the e-paper may be flexible. In some embodiments, the e-paper may consume less power in comparison with other types of displays.

In some embodiments, the grounding element 11g may be adjacent to (or may be formed on) the surface 112 of the display module 11. In some embodiments, the grounding element 11g of the display module 11 may act as one of the set of electrodes by which the electric field applied to the e-paper is created. For example, the grounding element 11g of the display module 11 may be the conductive ground layer. In some embodiments, the grounding element 11g of the display module 11 may be a negative electrode plane.

In some embodiments, the grounding element 11g of the display module 11 may act as a grounding element (or a reference ground) of the antenna pattern 12. For example, the grounding element 11g of the display module 11 may be shared between the display module 11 and the antenna pattern 12. For example, the display module 11 and the antenna pattern have a common ground (i.e., the grounding element 11). Specifically, the grounding element 11g of the display module 11 may improve the performance of the antenna pattern 12, such as by decreasing the resonant frequency of the antenna pattern 12, providing better return loss, etc. In some embodiments, a part of the antenna pattern 12 may be connected with the grounding element 11g.

In some embodiments, by using the grounding element 11g of the display module 11 as a grounding element of the antenna pattern 12, no space for ground clearance is needed. Therefore, the size of the electronic device 1 may be miniature and the cost may be reduced.

In some embodiments, the sensing element 17 and the controller 14 may implement a touch control function. In some embodiments, an e-paper, the sensing element 17, and the controller 14 may be integrated in the display module 11. In some embodiments, a user may control the functions of the electronic device 1 (e.g., adjust a sound volume of the electronic device 1, turn on or turn off Bluetooth® of the electronic device 1, change contents on the screen of the display module 11, etc.) by touching the screen of the display module 11. The sensing element 17 may detect changes in pressure, light, displacement, heat, resistance and/or other physical parameters from the touch event. However, a user may control the functions of the electronic device 1 by other interactions with the sensing element 17. The controller 14 may receive a signal from the sensing element 17. The controller 14 may process a signal from the sensing element 17. The controller 14 may control the functions of the electronic device 1 as listed above based on the signal from the sensing element 17. The controller 14 may control the display module 11 based on the signal from the sensing element 17. The controller 14 is placed on the surface 112 as shown in FIG. 2B. In some other embodiments, the controller 14 may be placed on any location of the display module 11. The location, the number, the shape, and the dimension of the controller 14 are not limited to the particular embodiment as illustrated in FIG. 2B.

The display module 11 and the antenna pattern 12 may be supported by the supporting layer 13. In some embodiments, the supporting layer 13 may include a flexible printed wiring board or another flexible substrate such that the supporting layer 13 may be bent or twisted. In some embodiments, the supporting layer 13 may include a resin material (e.g. polyester (PET), polyimide (PI), FR-4, etc.)).

In some embodiments, the supporting layer 13 may have a portion 13a supporting the display module 11 and a portion 13b supporting the antenna pattern 12. For example, the grounding element 11g may be on the portion 13a of the supporting layer 13 and the antenna pattern 12 may be on the portion 13b of the supporting layer 13. To illustrate, as shown in the top view of FIG. 2A, a vertical projection of the grounding element 11g is free from overlapping with a vertical projection of the antenna pattern 12. For example, the grounding element 11g is not overlapped with the antenna pattern 12 in a direction substantially perpendicular to the grounding element 11g. For example, the grounding element 11g is not overlapped with the antenna pattern 12 in a direction substantially perpendicular to the portion 13a of the supporting layer 13. In some embodiments, the supporting layer 13 may have a radiation area where the antenna pattern 12 is disposed. The antenna pattern 12 may be disposed over or on a radiation area of the supporting layer 13.

Referring back to the side view of FIG. 2B, the grounding element 11g and the antenna pattern 12 are illustrated as disposed on the same surface of the supporting layer 13. In some other embodiments where the supporting layer 13 has multiple layers or the supporting layer 13 includes a multiple layer structure, the grounding element 11g and the antenna pattern 12 may be disposed on different layers of the supporting layer 13. For example, the supporting layer 13 may include a multiple layer structure, such as a two-layer substrate or a four-layer substrate. For example, a two-layer substrate may include a top layer including the antenna pattern 12 and a bottom layer including the grounding element 11g. For example, a four-layer substrate may further include a power plane and a layer for signal routing. For example, the antenna pattern 12 may be connected with a feeding line 12w in the supporting layer 13. The feeding line 12w may further be connected to the substrate 16.

In some embodiments, the portion 13a may be connected with the portion 13b. For example, the portion 13a may be connected with the portion 13b through the other portion of the supporting layer 13. For example, the portion 13a and the portion 13b may be at different elevations and connected through an inclined plane of the supporting layer 13. For example, a distance between the portion 13a and the surface 111 may be different from a distance between the portion 13b and the surface 111. For example, a distance between the portion 13a and the surface 111 may be greater than a distance between the portion 13b and the surface 111. For example, a distance between the grounding element 11g and the surface 111 may be greater than a distance between the antenna pattern 12 and the surface 111. In some other embodiments, the portion 13a may be unconnected with the portion 13b (such as illustrated in FIG. 3B).

The display module 11 and the antenna pattern 12 may be side-by-side with respect to each other. For example, the surface 113 of the display module 11 may face the antenna pattern 12. For example, a vertical projection of the display module 11 is free from overlapping with a vertical projection of the antenna pattern 12. For example, the antenna pattern 12 is not overlapped with the display module 11 in a direction substantially perpendicular to the grounding element 11g. For example, the antenna pattern 12 is not overlapped with the display module 11 in a direction substantially perpendicular to the supporting layer 13.

The antenna pattern 12 may have one side supported by the supporting layer 13 and the other side attached to the surface 101 of the housing 10 through an adhesive layer (e.g., tape or adhesive film) 12d.

In some embodiments, in a direction substantially perpendicular to the grounding element 11g, the antenna pattern 12 is disposed between the surface 101 of the housing 10 and the grounding element 11g. For example, the antenna pattern 12 and the grounding element 11g are not disposed at the same elevation. For example, the antenna pattern 12 is disposed at an upper elevation with respect to the grounding element 11g. For example, the antenna pattern 12 is closer to the surface 101 of the housing 10 and the grounding element 11g is farther from the surface 101 of the housing 10. In some embodiments, in comparison with disposing the grounding element 11g and the antenna pattern 12 at the same elevation, disposing the grounding element 11g and the antenna pattern 12 at different elevations may improve various properties of the antenna pattern 12, such as voltage standing wave ratio (VSWR), return loss, directive gain, etc.

In some embodiments, by arranging the antenna pattern 12 to be attached to the surface 101 of the housing 10 and disposed side-by-side with the display module 11, the electromagnetic waves transmitted or received by the antenna pattern 12 may be omnidirectional without being affected or blocked by the other components (such as the display module 11 or the grounding element 11g) in the housing 10.

In some embodiments, the antenna pattern 12 may be a Flexible printer circuit (FPC) antenna or any other feasible antennas. For example, the supporting layer 13 may be the substrate of the FPC antenna. In some embodiments, the antenna pattern 12 may be an omnidirectional antenna. In some embodiments, the antenna pattern 12 may be a Bluetooth® antenna. In some embodiments, the antenna pattern 12 may be, or may include, a conductive material such as a metal or metal alloy. Examples of the conductive material include gold (Au), silver (Ag), aluminum (Al), copper (Cu), or an alloy thereof. In some embodiments, the antenna pattern 12 may include a single antenna element. In some embodiments, the antenna pattern 12 may include multiple antenna elements. For example, the antenna pattern 12 may include an M×N array of antenna elements, where M or N is an integer greater than 1. In some embodiments, M can be the same as or different from N depending on design specifications.

In some embodiments, a protection layer (not illustrated in the figures) may be disposed on the supporting layer 13 to surround the antenna pattern 12. In some embodiments, the antenna pattern 12 may be partially covered or partially encapsulated by the protection layer. In some embodiments, the protection layer may include a solder resist or solder mask, a PI, a polypropylene (PP), an epoxy, an epoxy-based material, or other feasible materials.

In some embodiments, the substrate 16 may be, for example, a printed circuit board, such as a paper-based copper foil laminate, a composite copper foil laminate, or a polymer-impregnated glass-fiber-based copper foil laminate. In some embodiments, the substrate 16 may include an interconnection structure, such as a redistribution layer (RDL), a grounding element, and/or a feeding line. In some embodiments, the substrate 16 may include solder resists (or solder mask) (not illustrated in the figures) on a surface of the substrate 16 to fully expose or to expose at least a portion of a conductive pad 15b for electrical connections.

In some embodiments, the substrate 16 may be disposed under the antenna pattern 12 and the display module 11. For example, a surface of the substrate 16 may face the antenna pattern 12 and the display module 11. For example, the antenna pattern 12 and the display module 11 may be disposed on the same side of the substrate 16. For example, a portion of the substrate 16 may be projected toward a corresponding surface of the antenna pattern 12 and a portion of the substrate 16 may be projected toward a corresponding surface of the display module 11. For example, at least a part of a projection of the substrate 16 on the supporting layer 13 is within the supporting layer 13. For example, the substrate 16 and the support layer 13 is at least partially overlapping in a vertical direction.

In some embodiments, the substrate 16 may be configured to support a component that can be removed from the display module 11 or from the supporting layer 13 to further miniaturize the electronic device 1. For example, in order to place the antenna pattern 12 in the housing 10 with sufficient clearance from the rest of the components, the antenna pattern 12 is not disposed on the substrate 16. On the other hand, the rest of the components may be disposed on the substrate 16 to further miniaturize the electronic device 1.

In some embodiments, the substrate 16 may have an electronic component 16a disposed thereon. In some embodiments, the electronic component 16a may be a chip or a die including a semiconductor substrate, one or more integrated circuit devices and one or more overlying interconnection structures therein. The integrated circuit devices may include active devices such as transistors and/or passive devices such as resistors, capacitors, inductors, or a combination thereof. In some embodiments, the electronic component 16a may be a transmitter, a receiver, or a transceiver. In some embodiments, the electronic component 16a may include an RF IC. Although there is only one electronic component in FIG. 2B, the number of the electronic components is not limited thereto. In some embodiments, there may be any number of electronic components depending on design requirements.

In some embodiments, the electronic component 16a may be disposed right below the supporting layer 13. For example, at least a part of a projection of the electronic component 16a on the supporting layer 16 is within the supporting layer 13. For example, the electronic component 16a and the supporting layer 13 are at least partially overlapping in a vertical direction. In some embodiments, the electronic component 16a may be physically disconnected from the supporting layer 13. For example, the electronic component 16a does not contact the supporting layer 13. For example, the electronic component 16a does not directly contact the supporting layer 13.

In some embodiments, the electronic component 16a may be electrically connected to one or more of other electrical components and to the substrate 16, and the electrical connections may be attained by way of flip-chip or wire-bond techniques. In some embodiments, the electronic component 16a may be electrically connected with the supporting layer 13. In some embodiments, the electronic component 16a may be electrically connected with the display module 11 (such as the controller 14, the sensing element 17, and the e-paper thereof) through the conductive pad 15b on the substrate 16, the connector 15, and a conductive pad 15a on the supporting layer 13. In some embodiments, the connector 15 may include a flexible printed wiring board or another flexible substrate such that the connector 15 may be bent or twisted. It is to be noted that, although the substrate 16 is connected to the supporting layer 13 by using the connector 15 according to an embodiment of the present disclosure, the substrate 16 may be connected to the supporting layer 13 by using another alternative method(s) or component(s). For example, the substrate 16 may be connected to the supporting layer 13 by using any bridged element.

Figure 3A:
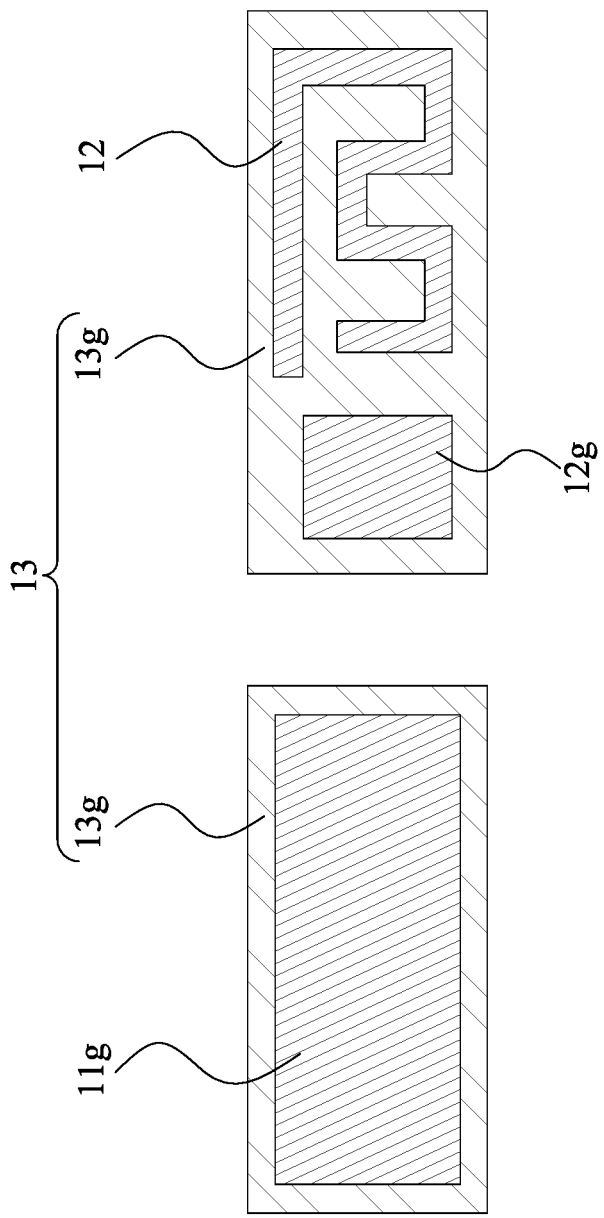
FIG. 3A illustrates a top view of an electronic device in accordance with some embodiments of the present disclosure.
Figure 3B:
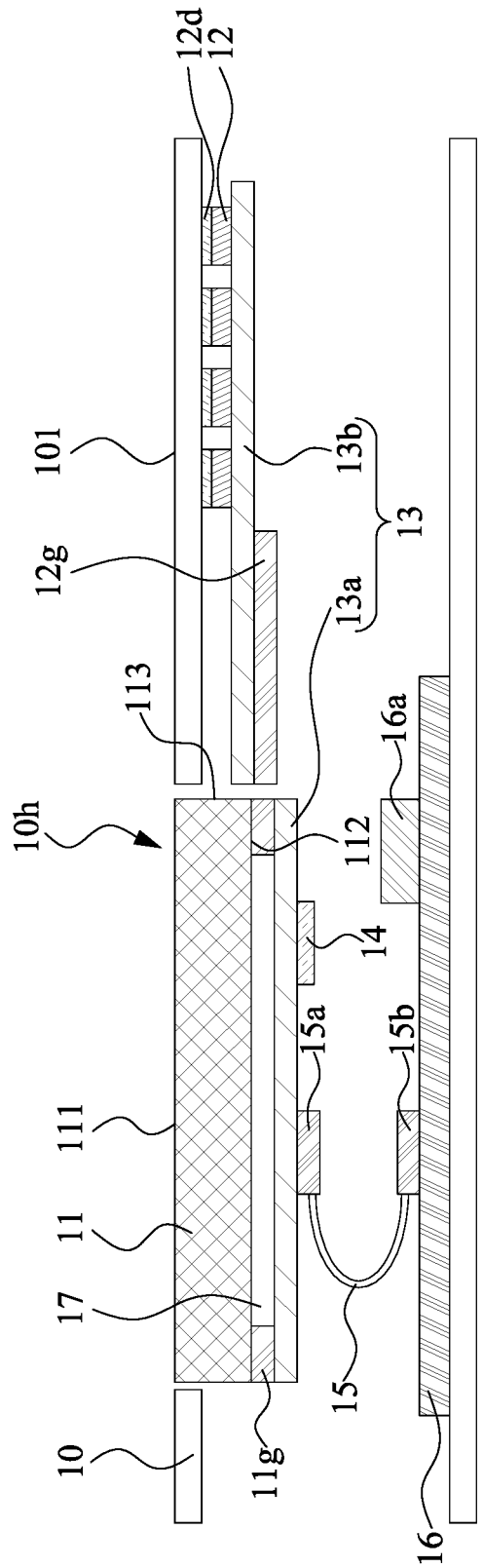
FIG. 3B illustrates a side view of an electronic device in accordance with some embodiments of the present disclosure.

FIG. 3A and FIG. 3B illustrate a top view and a side view, respectively, of an electronic device in accordance with some embodiments of the present disclosure. In some embodiments, the electronic device 1 in FIG. 1A may have a top view and a side view as illustrated in FIG. 3A and FIG. 3B. It should be noted that only the supporting layer 13, the antenna pattern 12, and grounding elements 11g, 12g are illustrated in FIG. 2A, and some components of the electronic device in FIG. 3A are omitted for conciseness.

The electronic device in FIG. 3A and FIG. 3B is similar to the electronic device in FIG. 2A and FIG. 2B, except that the electronic device in FIG. 3A and FIG. 3B further includes a grounding element 12g, and that the portion 13a and the portion 13b are not connected with each other.

Referring to FIG. 2A, the grounding element 11g may be on the portion 13a of the supporting layer 13. The grounding element 12g and the antenna pattern 12 may be on the portion 13b of the supporting layer 13. For example, a vertical projection of the grounding element 12g is free from overlapping with a vertical projection of the antenna pattern 12. For example, the grounding element 12g is not overlapped with the antenna pattern 12 in a direction substantially perpendicular to the grounding element 12g. In some embodiments, the grounding element 12g may be disposed on a surface of the supporting layer 13. For example, the grounding element 12g may be disposed on a surface of the supporting layer 13 facing the substrate 16. For example, the grounding element 12g may be disposed on a surface of the supporting layer 13 facing away from the substrate 16. In some embodiments, the grounding element 12g may be disposed in the supporting layer 13.

In some embodiments, as described with respect to FIG. 2B, the grounding element 11g of the display module 11 may act as one of the set of the electrodes by which the electric field applied to the e-paper is created. In some embodiments, the grounding element 11g of the display module 11 is not shared between the display module 11 and the antenna pattern 12.

In some embodiments, the grounding element 12g may act as a grounding element of the antenna pattern 12. For example, the grounding element 12g may improve the performance of the antenna pattern 12, such as by decreasing the resonant frequency of the antenna pattern 12, providing better return loss, etc. In some embodiments, by forming the grounding element 12g outside of the display module 11, parameters (such as ground variation, substrate differences, etc.) that may vary between the display module 11 and the antenna pattern 12 may be separately considered. Therefore, the antenna pattern 12 may be more easily retuned or designed to achieve a better performance.

Figure 4A:
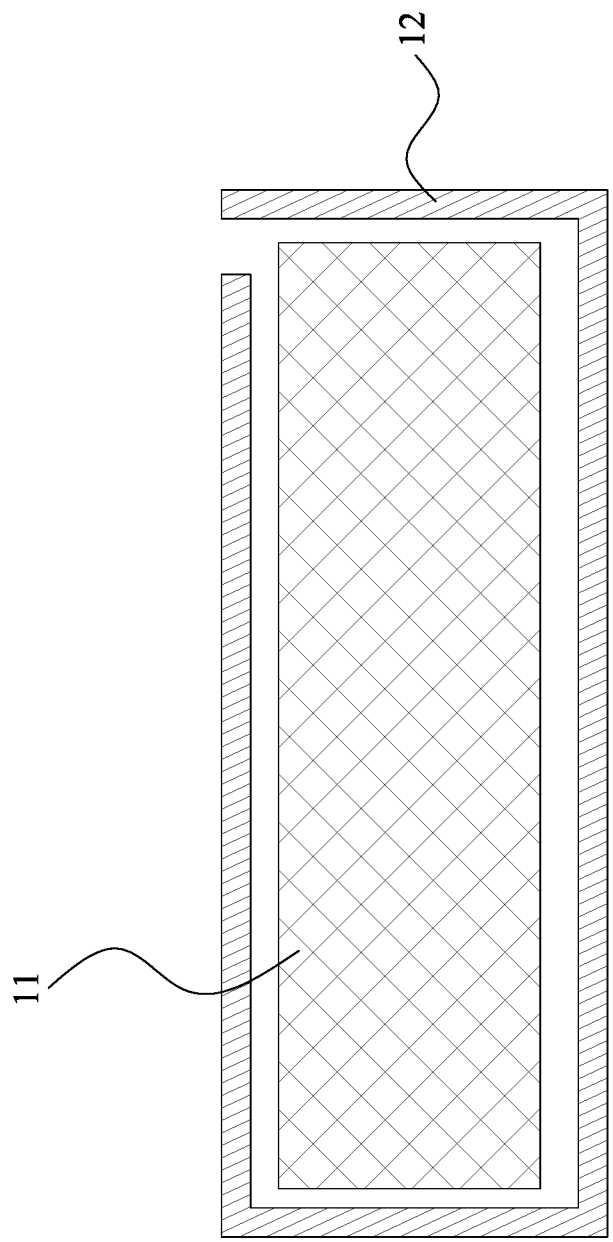
FIG. 4A illustrates a top view of an electronic device in accordance with some embodiments of the present disclosure.
Figure 4B:
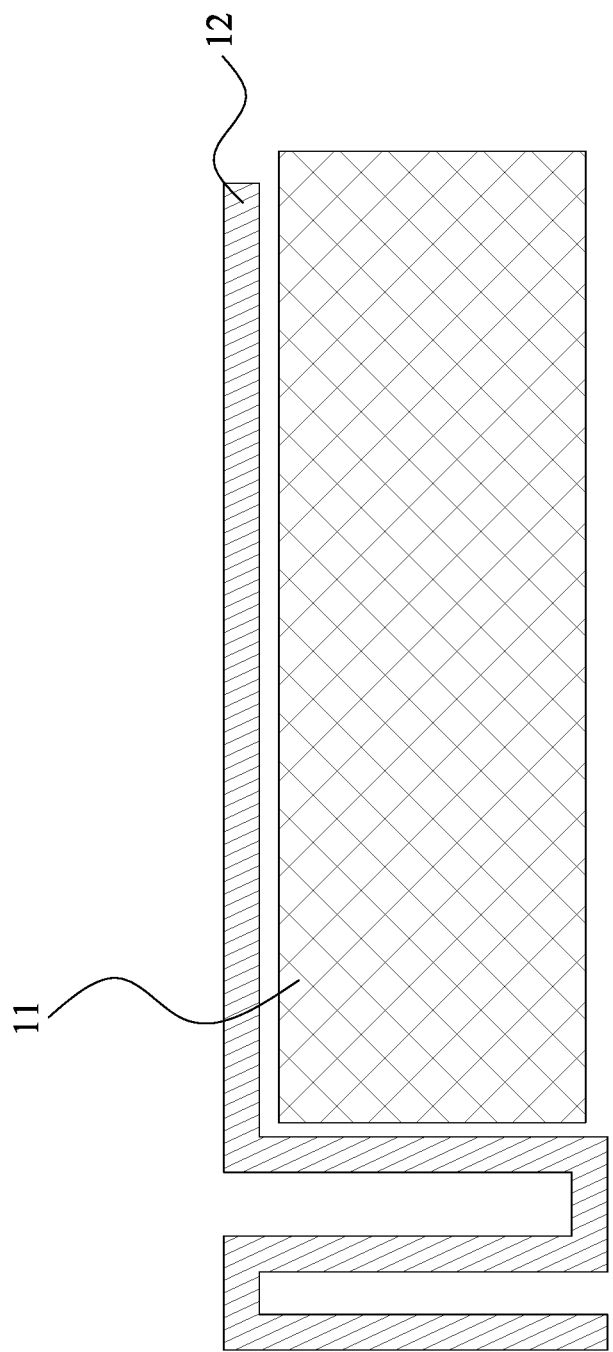
FIG. 4B illustrates a top view of an electronic device in accordance with some embodiments of the present disclosure.

FIG. 4A and FIG. 4B illustrate top views of an electronic device in accordance with some embodiments of the present disclosure. In some embodiments, the electronic device 1 in FIG. 1A may have a top view as illustrated in FIG. 4A and FIG. 4B. It should be noted that only the antenna pattern 12 and the display module 11 are illustrated in FIG. 4A and FIG. 4B, and some components of the electronic device in FIG. 4A and FIG. 4B are omitted for conciseness.

As shown in FIG. 4A, in some embodiments, the antenna pattern 12 may surround the display module 11 to make room or space for a larger screen of the display module 11.

As shown in FIG. 4B, in some embodiments, the antenna pattern 12 may extend to be adjacent to a side of the display module 11 to make room or space for a larger screen of the display module 11. The rest of the antenna pattern 12 may form a pattern next to the display module 11.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:
a display module having a grounding element disposed under the display module; and
an antenna pattern, wherein the grounding element is configured to function as a reference ground of the antenna pattern;
a supporting element supporting the grounding element, the display module, and the antenna pattern, wherein the supporting element has a sensing area adjacent to the display module, and wherein the display module is configured to change a display content according to a signal sensed in the sensing area;
a controller disposed on the supporting layer and configured to control the display module based on the signal sensed in the sensing area, wherein the supporting element has a first surface and a second surface opposite to the first surface of the supporting element, and wherein the display module is disposed on the first surface of the supporting element and the controller is disposed on the second surface of the supporting element; and
an electronic component electrically connected with the antenna pattern, wherein at least a part of a projection of the electronic component on the supporting element is within the supporting element, and the electronic component is physically disconnected from the supporting element.

2. The electronic device of claim 1, further comprising a substrate on which the electronic component is disposed, wherein at least a part of a projection of the substrate on the supporting element is within the supporting element wherein the substrate is electrically connected with the supporting element through a bridged element.

3. The electronic device of claim 2, wherein the bridged element includes a flexible printed wiring board.

4. The electronic device of claim 1, wherein a first portion of a surface of the substrate is projected toward a corresponding surface of the antenna pattern and a second portion of the surface of the substrate is projected toward a corresponding surface of the display module.

5. The electronic device of claim 1, wherein the display module has a first surface and a second surface opposite to the first surface of the display module, and the grounding element is disposed on the second surface of the display module.

6. The electronic device of claim 5, wherein the first surface of the display module is exposed from an opening on a surface of a housing.

7. The electronic device of claim 6, wherein the antenna pattern is disposed between the surface of the housing and the grounding element in a direction substantially perpendicular to the grounding element.

8. The electronic device of claim 7, wherein the antenna pattern and the display module are disposed side-by-side.

9. The electronic device of claim 6, wherein the antenna pattern is attached to the housing through an adhesive layer.

10. The electronic device of claim 1, wherein the display module comprises an electronic paper display.

11. A wearable device, comprising:
    a supporting element, wherein the supporting element comprises:
        a sensing area configured to sense a signal; and
        a display area laterally spaced apart from the sensing area and electrically connected with the sensing area, wherein the display area is configured to display a content in response to the signal;
    a housing having an opening, wherein the sensing area and the display area are exposed from the opening, wherein the supporting element further comprising a radiation area adjacent to the opening and covered by the housing; and
    an electronic paper display within the display area and an antenna within a radiation area, wherein the antenna is electrically connected to a grounding element of the electronic paper display.

12. The wearable device of claim 11, further comprising:
    a sensing electrode formed on the support element and within the sensing area.

* * * * *